(12) United States Patent
Gao

(10) Patent No.: US 11,852,831 B1
(45) Date of Patent: Dec. 26, 2023

(54) MULTIFUNCTIONAL SMART EYEGLASSES WITH ADJUSTABLE FLEXIBLE EAR-HOOKS

(71) Applicant: MIRIK AUDIOINC.

(72) Inventor: Xiaojun Gao, Ruichang (CN)

(73) Assignee: MIRIK AUDIOINC., Beachwood, OH (US)

( * ) Notice: Subject to any disclaimer, the term of this patent is extended or adjusted under 35 U.S.C. 154(b) by 0 days.

(21) Appl. No.: 18/109,272

(22) Filed: Feb. 14, 2023

(51) Int. Cl.
G02B 27/01 (2006.01)
G02C 9/04 (2006.01)
G02C 11/00 (2006.01)

(52) U.S. Cl.
CPC .......... *G02B 27/0172* (2013.01); *G02C 9/04* (2013.01); *G02C 11/10* (2013.01); *G02B 2027/014* (2013.01); *G02B 2027/0138* (2013.01)

(58) Field of Classification Search
USPC .............................................................. 345/8
See application file for complete search history.

(56) References Cited

U.S. PATENT DOCUMENTS

| | | | | |
|---|---|---|---|---|
| 5,608,808 A * | 3/1997 | da Silva | ................. | G02C 11/10 351/123 |
| 10,353,221 B1 * | 7/2019 | Graff | .................... | G02C 5/2209 |
| 11,197,083 B2 * | 12/2021 | Jain | ........................ | H04R 1/105 |
| 2005/0164747 A1 * | 7/2005 | Levy | .................... | H04M 1/6066 455/575.1 |
| 2005/0206836 A1 * | 9/2005 | Shapiro | ..................... | G02C 9/00 351/110 |
| 2005/0275793 A1 * | 12/2005 | Yamaguchi | .............. | G02C 1/02 351/41 |
| 2006/0187405 A1 * | 8/2006 | Lee | .......................... | G02C 9/04 351/47 |
| 2007/0120974 A1 * | 5/2007 | Chen | ....................... | H04M 1/05 348/E7.079 |
| 2008/0143954 A1 * | 6/2008 | Abreu | ..................... | G06F 3/167 351/158 |
| 2008/0178435 A1 * | 7/2008 | Liu | ......................... | H04M 1/05 24/20 R |
| 2008/0205683 A1 * | 8/2008 | Weyer | .................... | G02C 11/10 381/381 |
| 2009/0086156 A1 * | 4/2009 | Salk | ......................... | G02C 9/04 351/57 |

(Continued)

*Primary Examiner* — Chineyere D Wills-Burns
(74) *Attorney, Agent, or Firm* — Bayramoglu Law Offices LLC

(57) ABSTRACT

A pair of multifunctional smart eyeglasses with adjustable flexible ear-hooks includes: a lens bracket, lens legs, nose pads, a left lens, a right lens and a connecting bridge, the left lens and the right lens are installed in the lens bracket that is connected by the connecting bridge to the nose pads; the lens leg includes a flexible ear-hook connecting part; flexible ear-hooks include memory steel wires and rubber sleeves therein, rubber sleeve temples and rubber sleeve extensions are located at lens leg ends and outer sides of lens leg frames, and deep memory steel wire recesses accommodate the memory steel wires; the nose pad includes the connecting bridge in an integral structure, and an annular groove is formed at an end of the connecting bridge near the nose pad. The smart eyeglasses can be adjusted to most comfortable tightness according to each person's head shape.

8 Claims, 4 Drawing Sheets

(56) References Cited

U.S. PATENT DOCUMENTS

| | | | |
|---|---|---|---|
| 2013/0077043 A1* | 3/2013 | Moran | G02C 11/00 |
| | | | 351/111 |
| 2014/0266988 A1* | 9/2014 | Fisher | G06F 3/04886 |
| | | | 345/8 |
| 2014/0362337 A1* | 12/2014 | Cheng | G02C 3/003 |
| | | | 351/156 |
| 2016/0301044 A1* | 10/2016 | Huang | H01M 50/296 |
| 2017/0026744 A1* | 1/2017 | Farzbod | H04R 1/46 |
| 2020/0081247 A1* | 3/2020 | Khaderi | A61B 5/6803 |
| 2020/0142222 A1* | 5/2020 | Belli | G02C 11/06 |

* cited by examiner

MULTIFUNCTIONAL SMART EYEGLASSES WITH ADJUSTABLE FLEXIBLE EAR-HOOKS

TECHNICAL FIELD

The present invention relates to the field of computer technology, and more particularly to a pair of multifunctional smart eyeglasses with adjustable flexible ear-hooks.

BACKGROUND

In recent years, with the rapid development of smart devices, smart eyeglasses have begun to attract people's attention and enthusiasm, and high expectations have been placed on the smart eyeglasses. Smart eyeglasses can have an independent operating system like a smartphone, and are easy to use and small in size. Most of the smart eyeglasses currently on the market have sound transmission functions, can integrate and replace traditional earphones. They may adopt transmission modes by bone conduction and by speakers. According to the transmission mode by bone conduction, small bones (auditory ossicles) of the inner ears are vibrated through pressure waves, and these vibrations are converted into tiny electronic brain waves, which make us aware of the sound. Compared with the traditional way of using speakers to play sound, the transmission mode by bone conduction has the disadvantage that users cannot enjoy normal and high-level sound quality, but it can prevent the eardrum from being continuously impacted by the airflow, thereby avoiding damage to the eardrum and hidden dangers of hearing loss during long-term wearing. It also does not affect the reception of surrounding sound information or normal conversation. A smart device refers to any device with computing and processing capabilities. It is a product of combination of a traditional device with computer technology, data processing technology, control theory, sensor technology, network communication technology, and power electronics technology. In recent years, with the rapid development of smart devices, smart eyeglasses are also gradually entering the civilian market, with the characteristics of easy use and small size.

Nose pads of traditional eyeglasses are usually connected by screws and connecting rods, which is troublesome to disassemble and labor-intensive, and the nose pads are prone to dirt accumulation and difficult to clean when worn for a long time. Ear-hooks of the glasses are fixed and non-adjustable, or elastic Ear-hooks will rebound after adjustment, so users can't adjust the tightness of the eyeglasses by themselves. The present invention designs a self-adjustable ear-hook which can be adjusted to the most comfortable tightness according to each person's head shape.

SUMMARY

Aiming at the deficiencies of the prior art, the present invention provides a pair of multifunctional smart eyeglasses with adjustable flexible Ear-hooks, combining the two sound transmission modes by bone conduction and by speakers, so that users can make a free choice according to their needs, and it is convenient to install, disassemble and also clean nose pads, and the smart eyeglasses can be adjusted to the most comfortable tightness according to each person's head shape.

To achieve the above objective, the present invention provides the following technical solutions:

A pair of multifunctional smart eyeglasses with adjustable flexible ear-hooks includes: a lens bracket, lens legs, nose pads, a left lens, a right lens and a connecting bridge, the left lens and the right lens are installed in the lens bracket that is connected by the connecting bridge to the nose pads; the lens leg is provided with a rechargeable power supply, a printed circuit board (PCB), a bone conduction device, a speaker coupled to a device cavity, and a connecting section located on one side of the device cavity, the bone conduction device is located at the connecting section, the connecting section includes an extension housing, the extension housing is hinged with the lens leg and provided with a positioning bead structure, a side of the lens leg facing the positioning bead structure is provided with a plurality of positioning grooves for the positioning bead structure to be embedded, and the positioning grooves are arranged in an arc-shaped linear structure in sequence; the lens leg includes a flexible ear-hook connecting part; flexible ear-hooks include memory steel wires and rubber sleeves therein, rubber sleeve temples and rubber sleeve extensions are located at lens leg ends and outer sides of lens leg frames, and deep memory steel wire recesses accommodate the memory steel wires; the nose pad includes the connecting bridge in an integral structure, and an annular groove is formed at an end of the connecting bridge near the nose pad.

As a further technical solution of the present invention, the memory steel wire resists permanent deformation or kink by incorporating an anti-bending material within an entire ambient temperature range, and the memory steel wire can be bent in any state through use of an elastic material and will not rebound, and when the tightness of the ear-hooks needs to be adjusted, the flexible ear-hooks are bent to the state of user-adaptive adjustment, and then the ear-hooks will maintain this state.

As a further technical solution of the present invention, the lens leg frames are connected with the memory steel wires. During the deformation of the memory steel wires, lens leg ends of the rubber sleeve temples and the rubber sleeve extensions of the lens leg frames each have a deep memory steel wire recess, and the memory steel wires are connected to the lens leg frames and the rubber sleeve temples.

As a further technical solution of the present invention, the lens leg is provided with a quick switching button for switching the working state of the speaker and the bone conduction device, and the lens leg is provided with a recessed part, and the recessed part is located on a top or bottom of the lens leg and the quick switching button is arranged in the recessed part.

As a further technical solution of the present invention, the device cavity is provided with a limiting groove, an earplug is embedded in the limiting groove, the speaker is located in the earplug, the speaker includes an extension line, one end of the extension line is connected to the speaker, and the other end of the extension line is connected to the PCB.

As a further technical solution of the present invention, a visual information collection device is arranged on the lens bracket or the lens leg, and a working method of the visual information collection device includes:

step S1: turning on a visual information collection mode by voice control or by pressing a button so that the visual information collection device collects image information from the front based on a YOLOv5 detection model, wherein in step (S1), target recognition is performed on each frame of original image information by a YOLOv5 algorithm to obtain a prediction box, different types of objects are also distinguished with prediction boxes of different colors, and category information, and confidence of a detected object are displayed in an upper left corner of a detection box;

step S2: performing image processing on the collected image information, extracting an appearance feature of the detected object, and saving the appearance feature as a low-dimensional vector to provide a basis for associated data, wherein in step (S2), the image processing uses an 8-dimensional vector to represent a motion state of the detection box of the detected image, and a position of a detection box of a next frame of image is predicted by a Kalman algorithm according to change in the motion state of the previous frame;

step S3: using a Hungarian algorithm to cascade match the prediction boxes with the detection boxes, and assigning a tracking number to each detection box; and mining text information expressed in the image information; wherein in the step (S3), the mining method includes: extracting an appearance feature of the detected object by using a simple convolutional neural network (CNN), saving the appearance feature with a data structure gallery, and obtaining a cost matrix by calculating a Mahalanobis distance of the motion state and a min-cosine distance of the appearance feature; and step S4: matching the text information with audio data; and outputting the matched audio data through earplugs or bone conduction devices.

As a further technical solution of the present invention, loss functions in the YOLOv5 algorithm include three parts: bounding box regression loss, category prediction loss, and confidence prediction loss, wherein GIoU Loss is used to calculate the bounding box regression loss, a CrossEntropy Loss function is used to calculate the category prediction loss, and the confidence prediction loss is calculated according to CrossEntropy Loss. The specific process of the YOLOv5 algorithm includes:

step S11: expressing a calculation formula of the bounding box regression loss function GIoU Loss and a relationship between a prediction box and a real box during the calculation process as follows:

$$I_{GIoU} = 1 - IoU + \frac{|C - B \cup B_1|}{|C|} \quad (1)$$

wherein in formula (1), I represents the bounding box regression loss function, B represents the size and position of the gray prediction box in the figure, B1 represents the size and position of the black real box in the figure, and C represents a diagonal length of a smallest area that contains both the prediction box and the real box regardless of whether B and B1 intersect;

step S12: using CIoU Loss to improve GIoU Loss to calculate regression loss of a bounding box, wherein CIoU Loss is provided considering the consistency of an aspect ratio of the bounding box, and the formula of CIoU Loss is expressed as:

$$L_{GIoU} = 1 - IoU + \frac{\rho^2(b, b_1)}{c^2} + av \quad (2)$$

in formula (2), L represents the CIoU Loss function, ρ represents a Euclidean distance between a center point of the prediction box and a center point of a target box, c represents the diagonal length of two boxes including the prediction box and the target box, b and b1 represent center points of the prediction box and the real box, a represents a positive trade-off parameter, and the expansion of a is expressed as:

$$a = \frac{v}{(1 - IoU) + v} \quad (3)$$

in formula (3), υ is used to measure the consistency of the aspect ratio of the prediction box and the target box and the expansion of v is expressed as.

$$v = \frac{4}{\pi^2}\left[\left(\arctan\frac{w_1}{h_1}\right) - \arctan\frac{w}{h}\right]^2 \quad (4)$$

in formula (4), w1 and w represent the width of the real box and the width of the prediction box respectively, h1 and h represent the height of the real box and the height of the prediction box respectively, and CioU Loss makes a overlapping area factor have priority in regression;

step 14: the function CrossEntropy Loss for calculating confidence prediction loss in YOLOv5 including two loss functions in formula (5):

$$CEL = \text{Log Soft max} + NLLLoss \quad (5)$$

wherein in formula (5), CEL represents CrossEntropy Loss, an output of the loss function is (batch, D), batch represents a number of samples, and D represents a number of categories; calculating Softmax for D corresponding to each batch, wherein a value of Softmax conforms to probability distribution to ensure that a sum of final output probabilities is 1, and the categories are mutually exclusive and interrelated; image information collection and detection is a binary classification problem, the CrossEntropy Loss is no longer applicable, BCEWithLog itsLoss is a loss function used to solve single-label binary classification or multi-label binary classification problems, and includes two loss functions in formula (6):

$$BCE = \text{Sigmoid} + BCELoss \quad (6)$$

calculating Sigmoid for the D value corresponding to each batch, wherein the D values corresponding to the batch in two detection results of the real box and the prediction box are independent of each other; and step 14: overlapping and slicing images input into the YOLOv5 algorithm model, and adjusting parameters of a plurality of layers prior to an output layer to achieve a purpose of initializing the model; specifically, dividing the input images $X_1, X_2 \ldots X_j$ into overlapped patches: $G_1, G_2 \ldots G_k$ and selecting M and N from predefined ranges [Mmin, Mmax] and [Nmin, Nmax] as hyperparameters; and adjusting patch size by maintaining the aspect ratio, so that the image width is kept between 800 and 1333 pixels during a fine-tuning process, so as to obtain enhanced images $X'_1, X'_2 \ldots X'_k$ that are larger than targets in the original images, wherein in the fine-tuning process, these original images and enhanced images need to be used at the same time, and finally collecting image information from the front by the YOLOv5 detection model is completed.

As a further technical solution of the present invention, the image processing method in step S2 includes:

S210: grayscaling an image into a black and white image, and extracting a detail texture image;

S220: denoising the detail texture image;

S230: obtaining a histogram of the denoised image; and

S240: carrying out highlight and shadow balance adjustment on the image according to the histogram.

As a further technical solution of the present invention, a visual information collection module configured to support the working method of the visual information collection device includes an image collecting module for image shooting and storage, an image receiving module for image transmission, a microchip for controlling entire image processing, a reconstructing module for reconstructing an image, a processing module for detecting the image, an image integrating module for digital processing of the detected image, an image storing module for storing the processed image, a display module for displaying the reconstructed image, and a data analysis module for performing graphic enhancement on the displayed image; an image converter converts the collected image into data, data converted into an image is stored through an image memory, the image data is then transmitted into a first reconstructing unit of the reconstructing module through the image receiving module, the transmitted data is reconstructed by the first reconstructing unit, data constructed by a second reconstructing unit is reconstructed again by the first reconstructing unit, and at the same time, the image data is transmitted to image edge detection of the processing module for detection by the image receiving module, the detected image data is processed by image filtering, and then the filtered image data is integrated by the image integrating module and then stored by the image storage module.

The beneficial effects of the present invention are as follows:

Different from the conventional technology, the present invention installs a memory steel wire at a tail end of the lens leg, and a rubber sleeve is fitted over the memory steel wire. The memory steel wire can be bent in any state at will and will not rebound. When the tightness of the ear-hooks needs to be adjusted, the ear-hooks only need to be bent to a suitable state by hand, and then the ear-hooks will maintain this state. In a scene where a wearer of the smart eyeglasses needs to keep the attention focused, due to the distraction caused by paying attention to the displayed content of the smart eyeglasses, the visual information collection mode can be turned on through smart voice control or by pressing a button, thereby improving the function of the smart eyeglasses to provide scene voice prompts for different environments and effectively reducing the safety hazards in the use of smart eyeglasses.

1. lens bracket; 2. Lens leg; 3. nose pad; 4. left lens; 5. right lens; 6. connecting bridge; 7. bone conduction device; 8. conflicting section; 9. connecting section; 10. drain hole; 11. quick switching button: 12. speaker; 13. extension line; 14. flexible ear-hook; 15. lens leg end; 16. rubber sleeve temple; 17. rubber sleeve extension; 18. Lens leg frame; 19. deep memory steel wire recess; 20. memory steel wire; 21. earplug; 22. device cavity; 23. positioning bead structure; 24. positioning groove; 25. collection device; 26. annular groove; 27. connecting rod; 28. connecting structure; and 29. Limiting groove.

DETAILED DESCRIPTION OF PREFERRED EMBODIMENTS

Preferred embodiments of the present invention will be described below in conjunction with the accompanying drawings. It should be understood that the embodiments described here are only used to illustrate and explain the present invention, and are not intended to limit the present invention.

Figure 1:
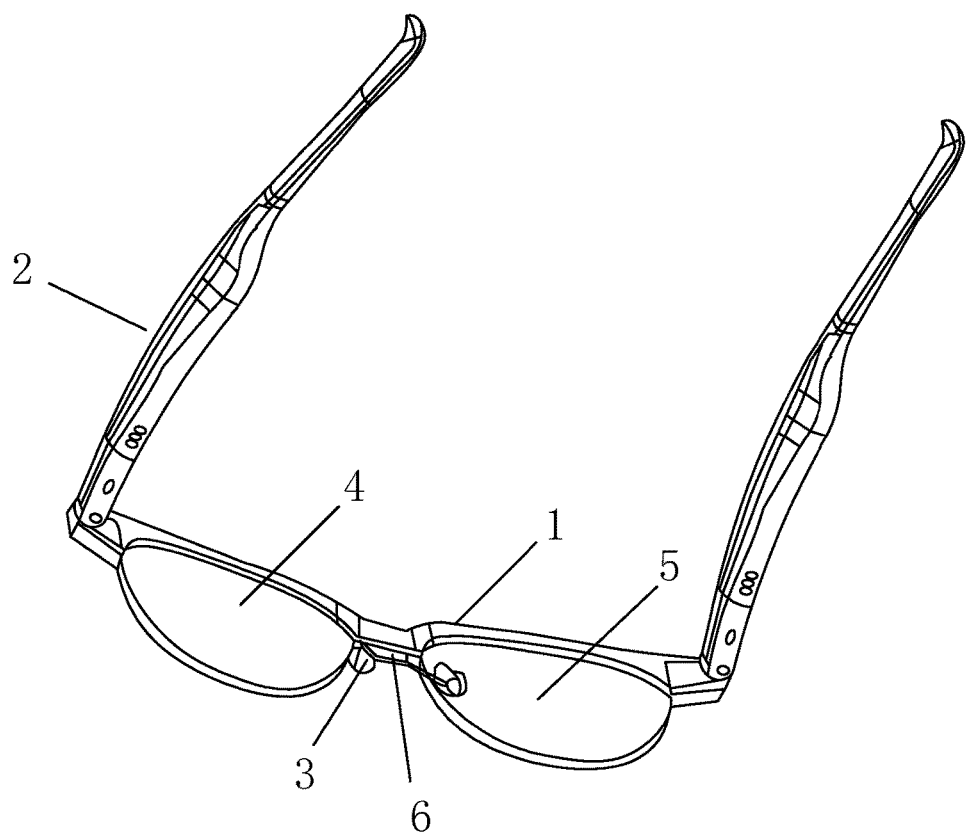
FIG. 1 is a schematic diagram of a pair of multifunctional smart eyeglasses with adjustable flexible ear-hooks.
Figure 2:
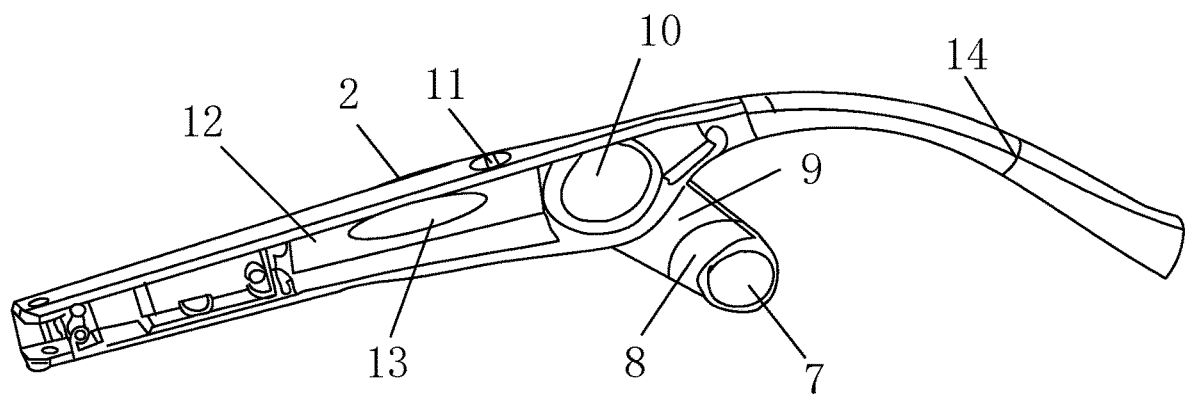
FIG. 2 is a schematic diagram of a lens leg of the smart eyeglasses.
Figure 3:
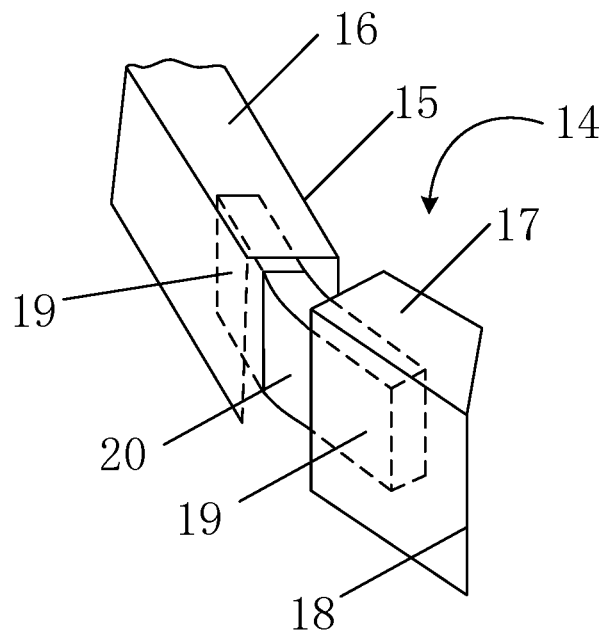
FIG. 3 is a schematic diagram of an adjustable flexible ear-hook.
Figure 4:
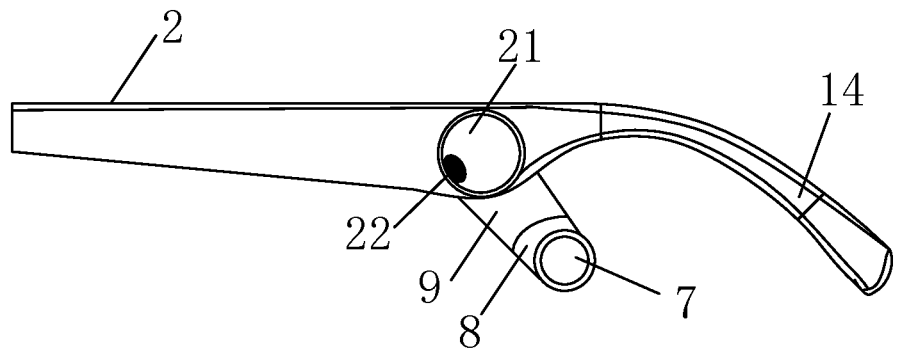
FIG. 4 is a schematic diagram of a combination of the lens leg of the smart eyeglasses and an earplug.
Figure 5:
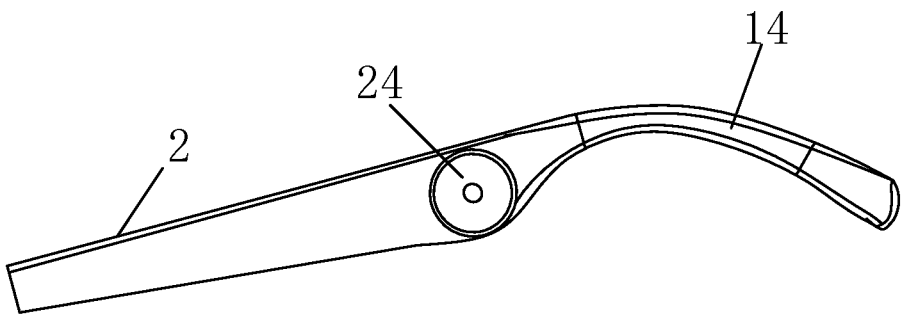
FIG. 5 is a schematic structural diagram of the combination of the lens leg and the earplug at the position of an extension housing.
Figure 6:
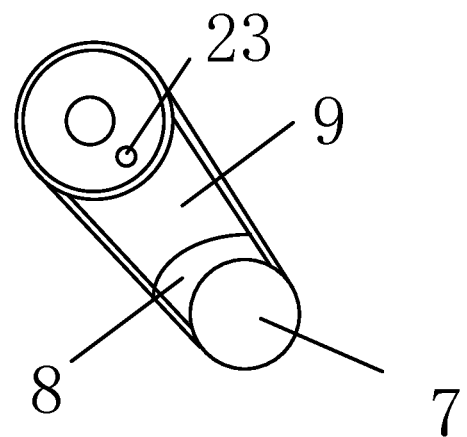
FIG. 6 is a schematic structural diagram of a joint between the lens leg and the extension housing.
Figure 7:
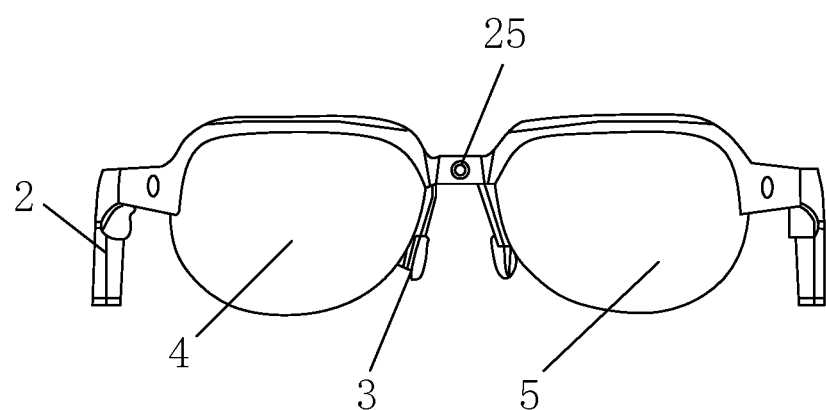
FIG. 7 is a front view of the multifunctional smart eyeglasses with adjustable flexible ear-hooks.
Figure 8:
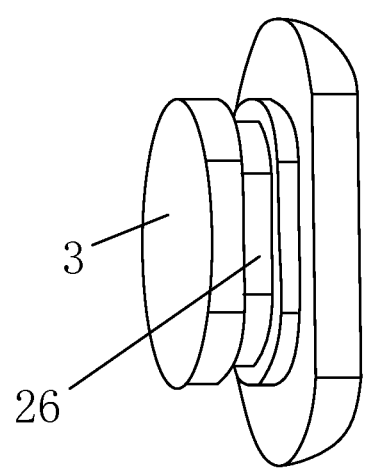
FIG. 8 is a schematic structural diagram of a joint between a nose pad and an annular groove.
Figure 9:
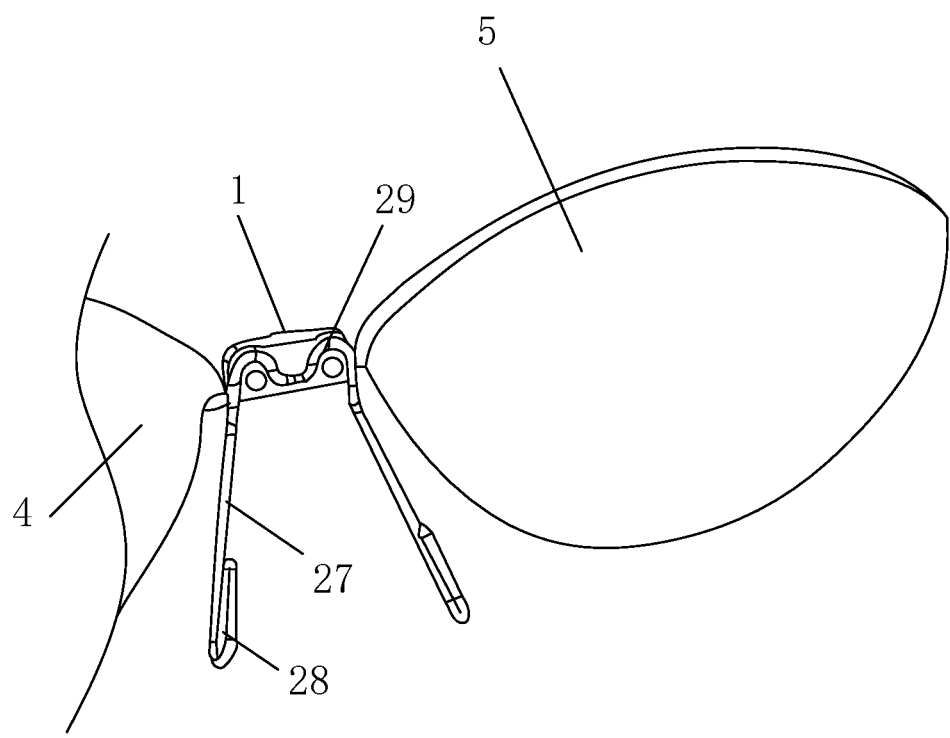
FIG. 9 is a schematic structural diagram of the nose pad of the smart eyeglasses.

As shown in FIGS. 1 to 9, a pair of multifunctional smart eyeglasses with adjustable flexible ear-hooks includes: a lens bracket 1, lens legs 2, nose pads 3, a left lens 4, a right lens 5 and a connecting bridge 6, the left lens 4 and the right lens 5 are installed in the lens bracket 1 that is connected by the connecting bridge 6 to the nose pads 3; the lens leg 2 is provided with a rechargeable power supply, a PCB board, a bone conduction device 7, a speaker 12 coupled to a device cavity 22, and a connecting section 9 located on one side of the device cavity 22, the bone conduction device 7 is located at the connecting section 9, the connecting section 9 includes an extension housing, the extension housing is hinged with the lens leg and provided with a positioning bead structure 23, a side of the lens leg facing the positioning bead structure 23 is provided with a plurality of positioning grooves 24 for the positioning bead structure 23 to be embedded in, and the positioning grooves 24 are arranged in an arc-shaped linear structure in sequence; the lens leg 2 includes a flexible ear-hook 14 connecting part; flexible ear-hooks 14 include memory steel wires 20 and rubber sleeves therein, rubber sleeve temples 16 and rubber sleeve extensions 17 are located at lens leg ends 15 and outer sides of lens leg frames 18, and deep memory steel wire recesses 19 accommodate the memory steel wires 20; the nose pad 3 includes the connecting bridge 6 in an integral structure, and an annular groove 26 is formed at an end of the connecting bridge 6 near the nose pad 3.

In a specific embodiment, the memory steel wire 20 resists permanent deformation or kink within an entire ambient temperature range. The memory steel wire 20 can be bent in any state and will not rebound. When the tightness of the ear-hooks needs to be adjusted, the flexible ear-hooks 14 only need to be bent to a suitable state, and then the ear-hooks will maintain the state. It should be noted that, in any of the above-mentioned embodiments, the environmental information and state information can be selected as separate conditions for detection, and if the detection result of any one of them meets preset conditions, it can be determined that a preset content display condition is met, and the content to be displayed is then normally displayed. The environmental information and state information can also be used as combined conditions to be detected separately, and only if it is determined that the two test results both meet the preset conditions, it is determined that the preset content display condition is met, and the content to be displayed is then normally displayed. In a specific embodiment, the memory steel wire 20 is connected to the lens leg frame 18; the memory steel wire 20 is deformed; the lens leg end 15 of the rubber sleeve temple 16 and the rubber sleeve extension 17 of the lens leg frame 18 are each provided with a deep memory steel wire recess 19; and the memory steel wire 20 can also be connected to the lens leg frame 18 and the rubber sleeve temple 16. When there is a content to be displayed in the smart eyeglasses, if it is determined that the current environment information and/or state information meet the preset content display condition, the content to be displayed will be displayed normally. If it is determined that the current environment information and state information do not meet the preset content display condition, the content to be displayed is not directly displayed, and one or a combination of the following operations is further performed: according to control instructions of a smart eyeglasses wearer, including gesture instructions, voice command, visual command, brain wave instructions, or the like, controlling the smart eyeglasses to display the content to be displayed.

In a further embodiment, the memory steel wire 20 resists permanent deformation or kink by incorporating an anti-bending material within an entire ambient temperature range, and the memory steel wire 20 can be bent in any state through use of an elastic material and will not rebound, and when the tightness of the ear-hooks needs to be adjusted, the flexible ear-hooks 14 are bent to a state of user-adaptive adjustment, and then the ear-hooks will maintain the state.

In a further embodiment, the lens leg frame 18 is connected to the memory steel wire 20; the memory steel wire 20 is deformed; the lens leg end 15 of the rubber sleeve temple 16 and the rubber sleeve extension 17 of the lens leg frame 18 are each provided with a deep memory steel wire recess 19, and the memory steel wire 20 is connected to the lens leg frame 18 and the rubber sleeve temple 16. In a specific embodiment, the lens leg 2 is provided with a quick switching button 11 for switching the working state of the speaker 12 and the bone conduction device 7, and the lens leg 2 is provided with a recessed part 10, and the recessed part 10 is located on a top or bottom of the lens leg 2 and the quick switching button 11 is arranged in the recessed part 10. When there is the content to be displayed in the smart eyeglasses, the state information of the smart eyeglasses is first detected, and the detection includes detecting, by a sensor, whether the smart eyeglasses are currently being worn, and if so, speed or acceleration information of a current motion state of the smart eyeglasses is further obtained, and whether the motion speed reaches or exceeds a preset speed threshold is then determined. If the wearer's current motion speed is fast, distraction in a very short period of time may also lead to a great change in the original motion state. Moreover, the fast motion state also increases the difficulty for the wearer to accurately determine emergencies in a short period of time, thus posing safety hazards. Therefore, if it is determined that the motion speed reaches the preset threshold, it is determined that the current state information of the smart eyeglasses does not meet the preset content display condition, and the content to be displayed is not directly displayed; if the motion speed does not reach the preset threshold, it is determined that the current state information of the smart eyeglasses meets the preset content display condition, and the content to be displayed is normally displayed.

In a specific embodiment, the device cavity 22 is provided with a limiting groove 29, an earplug 21 is embedded in the limiting groove 29, the speaker 12 is located in the earplug 21, the speaker 12 includes an extension line 13, one end of the extension line 13 is connected to the speaker 12, and the other end of the extension line 13 is connected to the PCB board.

In a specific embodiment, a visual information collection device is arranged on the lens bracket or the lens leg, and a working method of the visual information collection device includes:

step S1: turning on a visual information collection mode by voice control or by pressing a button so that the visual information collection device collects image information from the front based on a YOLOv5 detection model. In step (S1), target recognition is performed on each frame of original image information by a YOLOv5 algorithm to obtain a prediction box, different types of objects are also distinguished with prediction boxes of different colors, and category information and confidence of a detected object are displayed in an upper left corner of a detection box. Compared with previous-generation YOLO algorithms, the YOLOv5 algorithm has improved the network structure and training skills in order to obtain higher reasoning speed and detection accuracy, and the detection accuracy can further enhance the tracking accuracy of the tracking algorithm.

Step S2: performing image processing on the collected image information, extracting an appearance feature of the detected object, and saving the appearance feature as a low-dimensional vector to provide a basis for associated data, wherein in step (S2), the image processing uses an 8-dimensional vector to represent a motion state of the detection box of the detected image, and a position of a detection box of a next frame of image is predicted by a Kalman algorithm according to change in the motion state of the previous frame. The essence of the Kalman filtering algorithm is the operation of data fusion. The Kalman gain functions as a weight in the fusion process. There are two fusion contents: they are the fusion between a prior state estimation value satisfying a certain distribution and an observation value satisfying a certain distribution, and a posterior state estimation value is obtained after the fusion.

Step S3: using a Hungarian algorithm to cascade match the prediction boxes with the detection boxes, and assigning a tracking number to each detection box; and mining text information expressed in the image information, wherein the Hungarian algorithm is generally implemented on a data structure such as a bipartite graph. It can be seen from the name of this kind of graph that elements in the graph will be divided into two parts, where vertices are divided into sets disjoint in pairs, and points that belong to the same set are not connected in pairs. In the step (S3), the mining method includes: extracting the appearance feature of the detected object by using a simple CNN, saving the appearance feature with a data structure gallery, and obtaining a cost matrix by calculating a Mahalanobis distance of the motion state and a min-cosine distance of the appearance feature.

Step S4: matching the text information with audio data; and outputting the matched audio data through earplugs or bone conduction devices.

In a specific embodiment, the audio data obtained by the earplugs is more accurate than that obtained by the bone conduction devices, and the soundproof earplugs are generally made of rubber or a low-pressure foam material or a high-elastic polyester material. After being inserted into the ear canal, the earplug is in close contact with the external auditory canal to isolate sound from entering the middle ear and the inner ear, achieving the purpose of sound insulation, so that people can get a quiet rest or working environment. Better sound-proof earplugs are generally made of sponge rubber or a low-pressure foam material, or a high-elastic polyester material. Most of them are designed for impact resistance, can be washed, and can be used repeatedly. However, using earplugs on the ears can cause earwax to be pushed into the middle ears when the earplugs are inserted into the ear canals, which can cause tinnitus, impair hearing, or cause pain or bacterial infection. Users with excess earwax should use earplugs more carefully and wash the earplugs frequently with water and mild soap. However, foam earplugs are usually disposable and may lose their slow-rebound properties after soaked in water and dried. In addition, noise-cancelling earplugs can be a trigger for ear infections, as many bacteria thrive in warm, humid environments.

In a specific embodiment, YOLOv5 can freely set the model structure by adjusting the depth and width of the network and takes into account the detection accuracy and speed, and therefore YOLOv5 is suitable as a deployment model for devices with limited computing performance. The backbone layer of the original version includes a Focus module, an SPP module and a BottleneckCSP network. The Focus module carries out slicing and convolution operations on a preprocessed 640×640×3 image to finally obtain a 320×320×32 feature map. BottleneckCSP divides the input feature map into two parts and the two parts are subjected to a convolution operation separately, and then subjected to local cross-layer merging, which is similar to ResNet's skip connection, so as to speed up the computing of the network and enrich the features extracted by the network. Then, the maximum pooling and tensor splicing of the SPP module improves a receptive field of the model. In addition, 3×3 convolution modules of the backbone layer have a step size of 2 and are alternately arranged with CSP modules to downsample the image, and finally the network outputs feature maps of three pixel sizes (80×80, 40×40, and 20×20) into a neck layer. A main component of the neck layer is a path aggregation network improved from a feature pyramid network. PANet adds a convolutional downsampling part to obtain three different sizes of feature maps input into a prediction layer. The depth of the feature map of the prediction layer is 3×(5+K), where K refers to a number of categories of detection targets. In terms of loss function, loss functions in the YOLOv5 algorithm include three parts: bounding box regression loss, category prediction loss, and confidence prediction loss, wherein GIoU Loss is used to calculate the bounding box regression loss, and a CrossEntropy Loss function is used to calculate the category prediction loss, the confidence prediction loss is calculated according to CrossEntropy Loss. The specific process of the YOLOv5 algorithm includes:

step S11: expressing a calculation formula of the bounding box regression loss function GIoU Loss and a relationship between a prediction box and a real box during the calculation process as follows:

$$I_{GIoU} = 1 - IoU + \frac{|C - B \cup B_1|}{|C|} \quad (1)$$

wherein in formula (1), I represents the bounding box regression loss function, B represents the size and position of the gray prediction box in the figure, B1 represents the size and position of the black real box in the figure, and C represents a diagonal length of a smallest area that contains both the prediction box and the real box regardless of whether B and B1 intersect;

step S12: using CIoU Loss to improve GIoU Loss to calculate regression loss of a bounding box, wherein CIoU Loss is provided considering the consistency of an aspect ratio of the bounding box, and the formula of CIoU Loss is expressed as:

$$L_{GIoU} = 1 - IoU + \frac{p^2(b, b_1)}{c^2} + av \quad (2)$$

in formula (2), L represents the CIoU Loss function, p represents a Euclidean distance between a center point of the prediction box and a center point of a target box, c represents the diagonal length of two boxes including the prediction box and the target box, b and b1 represent center points of the prediction box and the real box, a represents a positive trade-off parameter, and the expansion of a is expressed as:

$$a = \frac{v}{(1 - IoU) + v} \quad (3)$$

in formula (3), v is used to measure the consistency of the aspect ratio of the prediction box and the target box and the relative position, the center point distance, and the aspect ratio of the two frames are taken into account, which can more accurately reflect the loss of the model during training; the expansion of v is expressed as:

$$v = \frac{4}{\pi^2}\left[\left(\arctan\frac{w_1}{h_1}\right) - \arctan\frac{w}{h}\right]^2 \quad (4)$$

in formula (4), w1 and w represent the width of the real box and the width of the prediction box respectively, h1 and h represent the height of the real box and the height of the prediction box respectively, and CioU Loss makes a overlapping area factor have priority in regression; although GIoU solves the problem of disappearing gradients if the prediction box and the real box do not overlap when calculating IOU (Intersection over Union), it is very dependent on the original closed box of IoU and requires more iterations, so sometimes GIoU Loss cannot converge well; when the prediction box appears inside the real box, GIoU degenerates into IoU, resulting in inaccurate detection results;

step 14: the function CrossEntropy Loss for calculating confidence prediction loss in YOLOv5 including two loss functions in formula (5):

$$CEL = \text{Log Soft max} + NLL\text{Loss} \qquad (5)$$

wherein in formula (5), CEL represents CrossEntropy Loss, an output of the loss function is (batch, D), batch represents a number of samples, and D represents a number of categories; calculating Softmax for D corresponding to each batch, wherein a value of Softmax conforms to probability distribution to ensure that a sum of final output probabilities is 1, and the categories are mutually exclusive and interrelated; image information collection and detection is a binary classification problem, the CrossEntropy Loss is no longer applicable, BCEWithLogitsLoss is a loss function used to solve single-label binary classification or multi-label binary classification problems, and includes two loss functions in formula (6):

$$BCE = \text{Sigmoid} + BCE\text{Loss} \qquad (6)$$

calculating Sigmoid for the D value corresponding to each batch, wherein the D values corresponding to the batch in two detection results of the real box and the prediction box are independent of each other; and step 14: overlapping and slicing images input into the YOLOv5 algorithm model, and adjusting parameters of a plurality of layers prior to an output layer to achieve a purpose of initializing the model; specifically, dividing the input images $X_1, X_2 \ldots X_j$ into overlapped patches: G1, G2 . . . Gk and selecting M and N from predefined ranges [Mmin, Mmax] and [Nmin, Nmax] as hyperparameters; and adjusting patch size by maintaining the aspect ratio, so that the image width is kept between 800 and 1333 pixels during a fine-tuning process, so as to obtain enhanced images $X'_1, X'_2 \ldots X'_k$ that are larger than targets in the original images, wherein in the fine-tuning process, these original images and enhanced images need to be used at the same time, and finally collecting image information from the front by the YOLOv5 detection model is completed. Compared with the original algorithm, by modifying the calculation of bounding box regression and confidence prediction loss functions and using slice-assisted fine-tuning and reasoning, the YOLOv5 algorithm improves the average accuracy of the training process and the confidence of the detection process, reduces false detections and missed detections, and improves the generalization ability in dense small target scenarios. The improved algorithm architecture is relatively lightweight, can be integrated into a complete safety inspection framework, and can be widely deployed in various production sites, thus achieving a high application and promotion value.

In a specific embodiment, the image processing method in step S2 includes: grayscaling an image into a black and white image, and extracting a detail texture image; denoising the detail texture image; obtaining a histogram of the denoised image; and carrying out highlight and shadow balance adjustment on the image according to the histogram. In addition, a visual information collection module configured to support the working method of the visual information collection device includes an image collecting module for image shooting and storage, an image receiving module for image transmission, a microchip for controlling entire image processing, a reconstructing module for reconstructing an image, a processing module for detecting the image, an image integrating module for digital processing of the detected image, an image storing module for storing the processed image, a display module for displaying the reconstructed image, and a data analysis module for performing graphic enhancement on the displayed image; an image converter converts the collected image into data, data converted into an image is stored through an image memory, the image data is then transmitted into a first reconstructing unit of the reconstructing module through the image receiving module, the transmitted data is reconstructed by the first reconstructing unit, data constructed by a second reconstructing unit is reconstructed again by the first reconstructing unit, and at the same time, the image data is transmitted to image edge detection of the processing module for detection by the image receiving module, the detected image data is processed by image filtering, and then the filtered image data is integrated by the image integrating module and then stored by the image storage module.

In a specific embodiment, during the analysis processing of the displayed image data, since the digital image is often polluted by various noises in its formation, transmission and recording process, when an input object is not as expected in some aspects of image processing, noise will also be introduced into the resulting image. The processing module can use image data denoising, graphic segmentation, image data enhancement and other techniques in sequence to process image data according to requirements. The implementation method of the system of the present invention is simple and reasonable. Different functional modules are added flexibly according to the actual needs, thus achieving good versatility. Moreover, making full use of the processing capability of the reconstructing module can achieve hardware acceleration of the image algorithm, thereby greatly improving the performance of the reconfigurable design image processing module, also reducing the complexity of configuration, saving a certain amount of cost, expanding the scope of application, improving the accuracy of data image processing, and enriching the processing content. The present invention can perform complex nonlinear processing, has good flexibility, and can change the processing content by simply changing software.

When there is a content to be displayed in the smart eyeglasses, the content to be displayed is obtained by an obtaining module, the image collecting unit obtains an image of the current environment, and the determining module analyzes and determines whether the environment image contains relevant feature IDs, for example, road traffic sign IDs, such as highway IDs, road guidance or dangerous road section signs and the like. If the above-mentioned feature ID information is included in the environment image, then it is determined that the current environment information does not meet the preset content display condition, and the content to be displayed is not directly displayed. If the above-mentioned feature ID information is not recognized in the environment image, then it is determined that the current environment information meets the preset content display condition, and the display module normally displays the content to be displayed. When there is the content to be displayed in the smart eyeglasses, the content to be displayed is obtained by the obtaining module, the state information of the smart eyeglasses is detected by a motion detecting unit, and the detection includes detecting, by a sensor, whether the smart eyeglasses are currently being worn, and if so, speed or acceleration information of a current motion state of the smart eyeglasses is further obtained, and whether the motion speed reaches or exceeds a preset speed threshold is then determined by the determining module. If the wearer's current motion speed is fast, distraction in a very short period of time may also lead to a great change in the original motion state. Moreover, the fast motion state also increases the difficulty for the wearer to accurately determine emergencies in a short period of time, thus posing safety hazards. Therefore, if the motion speed reaches the preset threshold, it is determined that the current state information of the smart eyeglasses does not meet the preset content display condition, and the content to be displayed is not directly displayed; if the motion speed does not reach the preset threshold, it is determined that the current state information of the smart eyeglasses meets the preset content display condition, and the content to be displayed is normally displayed.

Although the specific embodiments of the present invention have been described above, those skilled in the art should understand that these specific embodiments are for illustration only, and those skilled in the art can make various omissions, substitutions and changes to the details of the above methods and systems without departing from the principle and essence of the present invention. For example, it is within the scope of the present invention to combine the above method steps so as to perform substantially the same function in substantially the same way to achieve substantially the same results. Therefore, the scope of the present invention is only limited by the appended claims.

What is claimed is:

1. A pair of multifunctional smart eyeglasses with adjustable flexible ear-hooks, comprising: a lens bracket, lens legs, nose pads, a left lens, a right lens and a connecting bridge, wherein
   the left lens and the right lens are installed in the lens bracket, and the lens bracket is connected by the connecting bridge to the nose pads;
   each of the lens legs is provided with a rechargeable power supply, a printed circuit board (PCB), a bone conduction device, a speaker coupled to a device cavity, and a connecting section located on a side of the device cavity;
   the bone conduction device is located at the connecting section;
   the connecting section comprises an extension housing, wherein the extension housing is hinged with each of the lens legs, and the extension housing is provided with a positioning bead structure;
   a side of each of the lens legs is provided with a plurality of positioning grooves for the positioning bead structure to be embedded, wherein the side of each of the lens legs faces the positioning bead structure, and the plurality of positioning grooves are arranged in an arc-shaped linear structure in sequence;
   each of the lens legs comprises a flexible ear-hook connecting part;
   memory steel wires and rubber sleeves are provided in flexible ear-hooks;
   rubber sleeve temples and rubber sleeve extensions are located at lens leg ends and outer sides of lens leg frames;
   deep memory steel wire recesses accommodate the memory steel wires;
   each of the nose pads comprises the connecting bridge in an integral structure, and an annular groove is formed at an end of the connecting bridge, wherein the end of the connecting bridge is adjacent to each of the nose pads.

2. The pair of multifunctional smart eyeglasses with the adjustable flexible ear-hooks according to claim 1, wherein the memory steel wire resists permanent deformation or kink by incorporating an anti-bending material within an entire ambient temperature range, and the memory steel wire is allowed be bent in any state through use of an elastic material and does not rebound, and when a tightness of the flexible ear-hooks needs to be adjusted, the flexible ear-hooks are bent to a state of user-adaptive adjustment, and then the flexible ear-hooks maintain the state.

3. The pair of multifunctional smart eyeglasses with the adjustable flexible ear-hooks according to claim 1, wherein the memory steel wire is connected to the lens leg frame; the memory steel wire is deformed; the lens leg end of the rubber sleeve temple and the rubber sleeve extension of the lens leg frame are each provided with a deep memory steel wire recess; and the memory steel wire is connected to the lens leg frame and the rubber sleeve temple.

4. The pair of multifunctional smart eyeglasses with the adjustable flexible ear-hooks according to claim 1, wherein the lens leg is provided with a quick switching button for switching a working state of the speaker and the bone conduction device, and the lens leg is provided with a recessed part, wherein the recessed part is located on a top or a bottom of the lens leg and the quick switching button is arranged in the recessed part.

5. The pair of multifunctional smart eyeglasses with the adjustable flexible ear-hooks according to claim 1, wherein the device cavity is provided with a limiting groove, an earplug is embedded in the limiting groove, the speaker is located in the earplug, and the speaker comprises an extension line, wherein a first end of the extension line is connected to the speaker, and a second end of the extension line is connected to the PCB board.

6. The pair of multifunctional smart eyeglasses with the adjustable flexible ear-hooks according to claim 1, wherein a visual information collection device is arranged on the lens bracket or the lens leg, and a working method of the visual information collection device comprises:
   step S1: turning on a visual information collection mode by voice control or by pressing a button so that the visual information collection device collects image information from a front based on a YOLOv5 detection model, wherein in step S1, target recognition is performed on each frame of original image information by a YOLOv5 algorithm to obtain a prediction box, different types of objects are also distinguished with prediction boxes of different colors, and category information and confidence of a detected object are displayed in an upper left corner of a detection box;
   step S2: performing an image processing on the collected image information, extracting an appearance feature of the detected object, and saving the appearance feature as a low-dimensional vector to provide a basis for associated data, wherein in step S2, the image processing uses an 8-dimensional vector to represent a motion state of the detection box of the detected image, and a position of a detection box of a next frame of image is predicted by a Kalman algorithm according to change in the motion state of the previous frame; and
   step S3: using a Hungarian algorithm to cascade match the prediction boxes with the detection boxes, and assigning a tracking number to each detection box; and mining text information expressed in the image information; wherein in the step S3, a mining method includes; extracting an appearance feature of the detected object by using a simple convolutional neural network (CNN), saving the appearance feature with a data structure gallery, and obtaining a cost matrix by calculating a Mahalanobis distance of the motion state and a min-cosine distance of the appearance feature; and step S4: matching the text information with audio data to obtain matched audio data, and outputting the matched audio data through earplugs or bone conduction devices.

7. The pair of multifunctional smart eyeglasses with the adjustable flexible ear-hooks according to claim 6, wherein loss functions in the YOLOv5 algorithm comprise a bounding box regression loss, a category prediction loss, and a confidence prediction loss, wherein GIoU Loss is used to calculate the bounding box regression loss, a CrossEntropy Loss function is used to calculate the category prediction loss, and the confidence prediction loss is calculated according to CrossEntropy Loss; a specific process of the YOLOv5 algorithm comprises:

step S11: expressing a calculation formula of the bounding box regression loss function GIoU Loss and a relationship between a prediction box and a real box during the calculation process as follows:

$$I_{GIoU} = 1 - IoU + \frac{|C - B \cup B_1|}{|C|} \qquad (1)$$

wherein in formula (1), I represents the bounding box regression loss function, B represents a size and a position of a gray prediction box in a figure, B1 represents a size and a position of a black real box in the figure, and C represents a diagonal length of a smallest area that contains both the prediction box and the real box regardless of whether B and B1 intersect;

step S12: using CIoU Loss to improve GIoU Loss to calculate regression loss of a bounding box, wherein CIoU Loss is provided considering a consistency of an aspect ratio of the bounding box, and a formula of CIoU Loss is expressed as:

$$L_{GIoU} = 1 - IoU + \frac{p^2(b, b_1)}{c^2} + av \qquad (2)$$

in formula (2), L represents the CIoU Loss function, ρ represents a Euclidean distance between a center point of the prediction box and a center point of a target box, c represents the diagonal length of two boxes comprising the prediction box and the target box, b and b1 represent a center point of the prediction box and a center point of the real box, a represents a positive trade-off parameter, and an expansion of a is expressed as:

$$a = \frac{v}{(1 - IoU) + v} \qquad (3)$$

in formula (3), v is used to measure the consistency of the aspect ratio of the prediction box and the target box and an expansion of v is expressed as:

$$v = \frac{4}{\pi^2}\left[\left(\arctan\frac{w_1}{h_1}\right) - \arctan\frac{w}{h}\right]^2 \qquad (4)$$

in formula (4), $w_1$ and w represent a width of the real box and a width of the prediction box respectively, $h_1$ and h represent a height of the real box and a height of the prediction box respectively, and CioU Loss makes a overlapping area factor have priority in regression;

step 14: the function CrossEntropy Loss for calculating confidence prediction loss in YOLOv5 comprises two loss functions in formula (5):

$$CEL = \text{Log Softmax} + NLL\text{Loss} \qquad (5)$$

wherein in formula (5), CEL represents CrossEntropy Loss, an output of the loss function is (batch, D), batch represents a number of samples, and D represents a number of categories; calculating Softmax for D corresponding to each batch, wherein a value of Softmax conforms to probability distribution to ensure that a sum of final output probabilities is 1, and the categories are mutually exclusive and interrelated; image information collection and detection is a binary classification problem, the CrossEntropy Loss is no longer applicable, BCEWithLogitsLoss is a loss function used to solve single-label binary classification or multi-label binary classification problems, and comprises two loss functions in formula (6):

$$BCE = \text{Sigmoid} + BCE\text{Loss} \qquad (6)$$

calculating Sigmoid for the D value corresponding to each batch, wherein the D values corresponding to the batch in two detection results of the real box and the prediction box are independent of each other; and step 14: overlapping and slicing images input into the YOLOv5 algorithm model, and adjusting parameters of a plurality of layers prior to an output layer to achieve a purpose of initializing the model; specifically, dividing the input images $X_1, X_2 \ldots X_j$ into overlapped patches: $G_1, G_2 \ldots G_k$ and selecting M and N from predefined ranges [Mmin, Mmax] and [Nmin, Nmax] as hyperparameters; and adjusting patch size by maintaining the aspect ratio, so that the image width is kept between 800 and 1333 pixels during a fine-tuning process to obtain enhanced images $X'_1, X'_2 \ldots X'_k$ that are larger than targets in the original images, wherein in the fine-tuning process, these original images and enhanced images need to be used at the same time, and finally collecting image information from the front by the YOLOv5 detection model is completed.

8. The pair of multifunctional smart eyeglasses with the adjustable flexible ear-hooks according to claim 6, wherein an image processing method in step S2 comprises:

S210: grayscaling an image into a black and white image, and extracting a detail texture image;

S220: denoising the detail texture image to obtain a denoised image;

S230: obtaining a histogram of the denoised image; and

S240: carrying out highlight and shadow balance adjustment on the image according to the histogram.

* * * * *